(No Model.)

G. VAN WAGENEN.
PNEUMATIC TIRE.

No. 537,506. Patented Apr. 16, 1895.

WITNESSES:
Gustave Dieterich
John Kehlenbeck

INVENTOR
George Van Wagenen,
BY
Chas. O. Gill
ATTORNEY.

UNITED STATES PATENT OFFICE.

GEORGE VAN WAGENEN, OF NEW YORK, N. Y.

PNEUMATIC TIRE.

SPECIFICATION forming part of Letters Patent No. 537,506, dated April 16, 1895.

Application filed June 19, 1894. Serial No. 515,052. (No model.)

*To all whom it may concern:*

Be it known that I, GEORGE VAN WAGENEN, a citizen of the United States, and a resident of New York, in the county of New York and State of New York, have invented certain new and useful Improvements in Pneumatic Tires for the Wheels of Vehicles, of which the following is a specification.

The invention relates to improvements in pneumatic tires for the wheels of vehicles, and its object is to provide a tire which will not under any ordinary conditions become punctured. The liability of pneumatic tires for bicycles becoming punctured when passing over a pointed or sharp edged object, the inconveniences resulting therefrom, and the many unsuccessful attempts to remedy such results are matters of common knowledge in the art to which the invention pertains, and it is therefore unnecessary to state them here.

It is the purpose of the present invention to so construct the tire that it will absolutely resist any tendency on the part of any object over which the wheel may pass to puncture the same, and this object I have successfully accomplished without increasing the weight or decreasing the "life" of the wheel.

In carrying my invention into effect I am enabled to dispense with many of the complicated features of the existing pneumatic tires and produce a tire of great durability and simplicity.

In accordance with my invention the tire has embedded within it a series of independent metallic plates whose side and end edges overlap each other and which plates while forming an impassable barrier to the entrance of a tack, nail or other cutting object, yield independently of each other both on lateral and longitudinal lines either under the inflation of the tube or the compression of the same while in use.

The invention will be readily understood from the detailed description hereinafter presented, reference being had to the accompanying drawings, in which—

Figure 1:
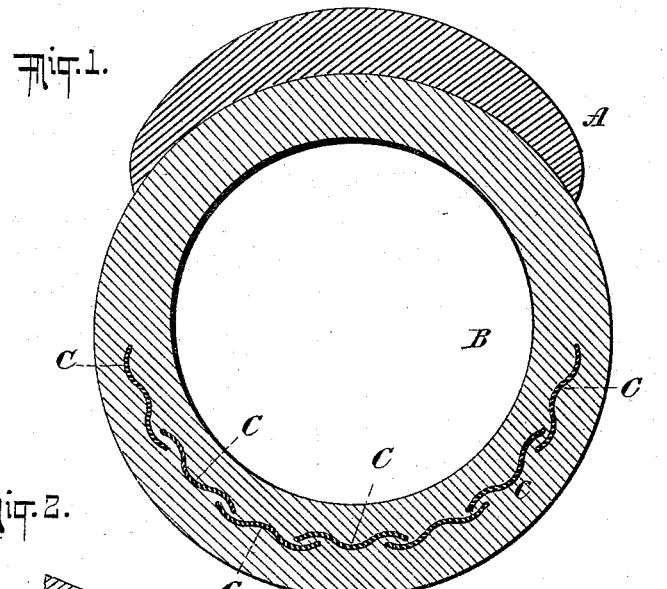
Figure 2:
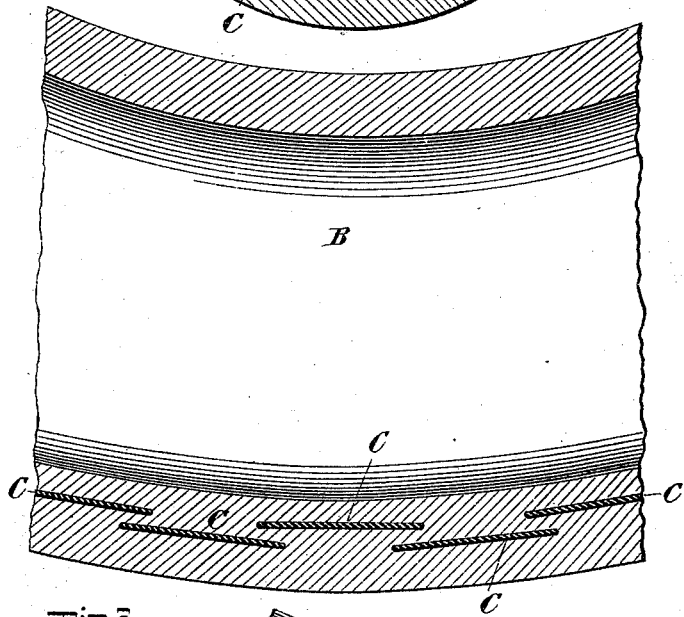
Figure 3:
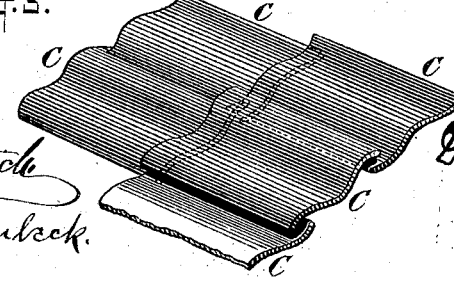

Figure 1 is a central, vertical, transverse section on an enlarged scale of a pneumatic tire constructed in accordance with and embodying the invention. Fig. 2 is a central vertical longitudinal section of same; and Fig. 3 is a detached perspective view of several of the independent metallic plates removed from the tire and shown with their edges and ends overlapping each other.

In the drawings A designates the rim of the wheel, B the pneumatic tire and C the independent metallic plates embedded within the latter. The rim A will be of any ordinary or suitable construction. The tire B consists of an inflatable rubber tube applied to the rim A and containing within its tread the plates C, the latter when arranged as described and claimed constituting the essential feature of the invention.

The invention is not limited to any special form, size or construction of the plates C, but it is important that said plates overlap each other at their edges and that they be small enough to yield independently of each other around the tread of the wheel and in line with the length of said tread.

The preferred form of the plates C is that illustrated in the drawings in which it will be observed that the plates are each corrugated and that the edges and ends thereof overlap each other both around the tread of the tire and in line with the length of the same.

In the practical manufacture of the pneumatic tire embracing the present invention the plates C will not only be independent of each other, but will be separated from each other a short distance as illustrated in Fig. 1 and the rubber into which they are embedded will fill in between the adjacent ends and edges of the said plates, whereby each plate will be independently incased by the rubber and be capable of an independent movement.

It will be observed upon reference to Fig. 1 that should the wheel pass over a tack, nail or other pointed or sharp object, the latter would be prevented from puncturing the tire by means of the plates C, which constitute an impassable barrier to the entrance of any object to the interior of the tire B. The plates C form a substantial metallic lining to arrest the entrance of a nail or other object to the interior of the tire, and said plates being independently yielding, they do not deaden the tire nor detract from its desirable functions as a pneumatic cushion.

The plates C will be formed of thin metal, preferably steel, and while preventing the puncturing of the tire increase the durability of the same and enable the manufacturer to dispense with many of the coverings which in existing tires are utilized to strengthen the same and prevent the accidental escape of the air therefrom.

The plates C while yielding with the rubber are not intended to bend, and said plates are, as shown, arranged on a series of lines extending transversely and longitudinally along the tread of the tire, so that while overlapping one another at their side and end edges they may readily independently yield both around the tread of the tire and in line with the length of the same, whereby said plates while subserving their own particular functions, do not in the least detract from the "life" of the wheel or the efficiency of the pneumatic cushion.

What I claim as my invention, and desire to secure by Letters Patent, is—

1. A pneumatic tire for a wheel, said tire having molded within its elastic tread and on planes conforming substantially to the surface outlines of said tread, the series of transverse and longitudinal lines of independent plates overlapping each other at their side and end edges and forming an internal lining of independent plates adapted to yield with the rubber both transversely and longitudinally on lines following the surface outline of the tread, substantially as and for the purposes set forth.

2. A pneumatic tire for a wheel, said tire having molded within its elastic tread and on planes conforming substantially to the surface outlines of said tread, the series of transverse and longitudinal lines of independent plates separated from but overlapping each other at their side and end edges and forming an internal lining of independent plates separated from each other by the rubber of the tread and adapted to yield with the rubber both transversely and longitudinally on lines following the surface outline of the tread; substantially as and for the purposes set forth.

Signed at New York, in the county of New York and State of New York, this 16th day of June, A. D. 1894.

GEORGE VAN WAGENEN.

Witnesses:
CHAS. C. GILL,
ED. D. MILLER.